United States Patent
Shea et al.

(10) Patent No.: US 8,325,467 B2
(45) Date of Patent: Dec. 4, 2012

(54) METHOD AND APPARATUS TO REDUCE INTERNAL PRESSURE CAUSED BY AN ARCING FAULT IN AN ELECTRICAL ENCLOSURE

(75) Inventors: John J. Shea, Pittsburgh, PA (US);
Ronald D. Hartzel, Butler, PA (US);
James E. Smith, Pittsburgh, PA (US);
Paul K. Parker, Pine Township, PA (US)

(73) Assignee: Eaton Corporation, Cleveland, OH (US)

( * ) Notice: Subject to any disclaimer, the term of this patent is extended or adjusted under 35 U.S.C. 154(b) by 273 days.

(21) Appl. No.: 12/947,904

(22) Filed: Nov. 17, 2010

(65) Prior Publication Data

US 2011/0149478 A1  Jun. 23, 2011

Related U.S. Application Data

(60) Provisional application No. 61/287,455, filed on Dec. 17, 2009.

(51) Int. Cl.
*H02B 1/00* (2006.01)
*H01H 33/08* (2006.01)
(52) U.S. Cl. ........... 361/601; 361/611; 218/155; 200/10
(58) Field of Classification Search ........... 361/600–678
See application file for complete search history.

(56) References Cited

U.S. PATENT DOCUMENTS

| 5,194,840 | A * | 3/1993 | Frutuoso et al. | 335/202 |
|---|---|---|---|---|
| 7,391,597 | B2 * | 6/2008 | Meeks et al. | 361/115 |
| 7,750,770 | B2 * | 7/2010 | Duchrow et al. | 335/202 |
| 7,952,857 | B1 * | 5/2011 | Motley et al. | 361/678 |
| 2011/0286165 | A1 * | 11/2011 | Carlson et al. | 361/679.01 |
| 2012/0097413 | A1 * | 4/2012 | Bugaris et al. | 174/50 |

OTHER PUBLICATIONS

Braunovic, M., "Effect of Connection Design on the Contact Resistance of High Power Overlapping Bolted Joints", IEEE Transactions on Components and Packaging Technologies, vol. 25, No. 4, Dec. 2002, pp. 642-650.

* cited by examiner

*Primary Examiner* — Zachary M Pape
(74) *Attorney, Agent, or Firm* — Eckert Seamans Cherin & Mellott, LLC; Kirk D. Houser

(57) ABSTRACT

An electrical enclosure includes a housing having a first end, an opposite second end, and a plurality of sides disposed therebetween to define an internal volume; an electrical busway having a plurality of electrical bus members; a plurality of phase-to-phase arc length limiters, each of the phase-to-phase arc length limiters being electrically connected to a corresponding one of the electrical bus members, each of the phase-to-phase arc length limiters having a first edge and a second edge, the first edge establishing a first gap to an adjacent one of the phase-to-phase arc length limiters; and a phase-to-ground arc length limiter electrically connected to the housing, the phase-to-ground arc length limiter having a number of members structured to attach an arc, each of the number of members having a number of arc attachment portions establishing a second gap to the second edge of the phase-to-phase arc length limiters.

20 Claims, 6 Drawing Sheets ic equipment. As one non-limiting example, switchgear includes an assembly of one or more motor starters that can also contain circuit breakers and fused switches. Example switchgear devices include, but are not limited by, a circuit interrupter, such as a circuit breaker (e.g., without limitation, low voltage; medium voltage; high voltage); a motor controller/starter; and/or any suitable device which carries or transfers current from one place to another.

METHOD AND APPARATUS TO REDUCE INTERNAL PRESSURE CAUSED BY AN ARCING FAULT IN AN ELECTRICAL ENCLOSURE

CROSS REFERENCE TO RELATED APPLICATION

This application claims the benefit of U.S. Provisional Patent Application Ser. No. 61/287,455, filed Dec. 17, 2009.

BACKGROUND

1. Field

The disclosed concept pertains generally to electrical enclosures and, more particularly, to such electrical enclosures structured to resist internal arcing faults. The disclosed concept also pertains to methods of reducing pressure caused by arcing faults.

2. Background Information

Electrical equipment such as, for example and without limitation, electrical busways, relays, circuit interrupters, electric meters and transformers, are typically housed within an electrical enclosure such as, for example, a housing, such as a box, cabinet, module or compartment, to protect the electrical equipment.

Electrical enclosures can enclose a wide range of electrical equipment, such as, for example and without limitation, medium voltage motor starter(s), low voltage switchgear, low voltage motor control center(s), low voltage switchboard(s), low voltage panelboard(s), and medium and/or low voltage transfer switches.

Switchgear typically includes a combination of an electrical busway and electrical disconnects, fuses and/or circuit breakers employed to electrically connect and disconnect electrical equipment. As one non-limiting example, switchgear includes an assembly of one or more motor starters that can also contain circuit breakers and fused switches. Example switchgear devices include, but are not limited by, a circuit interrupter, such as a circuit breaker (e.g., without limitation, low voltage; medium voltage; high voltage); a motor controller/starter; and/or any suitable device which carries or transfers current from one place to another.

Arc resistant switchgear is intended to mitigate the effects of internal arcing or arc flash outside of the electrical enclosure (e.g., without limitation, low voltage; medium voltage; high voltage). Unintended internal arcing faults can occur from a variety of causes (e.g., without limitation, accidental dropping of tools; the presence of animals; insulation failure).

Excessive pressure resulting from an unintended internal arcing fault can cause damage to the electrical enclosure resulting in hot gases, molten copper and steel escaping the electrical enclosure and creating a potential hazard. Hence, it is highly desirable to reduce internal pressures generated during an arcing fault, in order to reduce the chance of hot gases escaping from the electrical enclosure.

FIG. 1 shows a three-phase electrical busway 2 including back-connected (e.g., electrically connected to a surface facing the rear of the corresponding electrical enclosure (not shown)) power cables 4. The fault current path 6 in, for example, the bus members 12,10 provides a generally downward (with respect to FIG. 1) J×B force 14 that elongates the phase-to-phase arc 16. Similarly, another J×B force 15 elongates the other phase-to-phase arc 18 between bus members 10,8. Convective forces 20 attempt to lift (with respect to FIG. 1) the arcs 16,18 resulting in an angled downward (with respect to FIG. 1) direction 22 thereof as shown. The elongated arcs 16,18 increase the corresponding arc voltage and arc power and, thus, increase the pressure created in the corresponding electrical enclosure (not shown). Although not shown in FIG. 1, arcs (not shown) on the outer phases 24,26 attach to adjacent electrical enclosure walls (not shown).

There is room for improvement in electrical enclosures including an electrical busway.

There is also room for improvement in methods of reducing pressure caused by arcing faults.

SUMMARY

These needs and others are met by embodiments of the disclosed concept which employ a plurality of phase-to-phase arc length limiters each electrically connected to a corresponding electrical bus member and/or a phase-to-ground arc length limiter electrically connected to a housing.

In accordance with one aspect of the disclosed concept, an electrical enclosure comprises: a housing comprising a first end, an opposite second end, and a plurality of sides disposed therebetween to define an internal volume; an electrical busway comprising a plurality of electrical bus members; a plurality of phase-to-phase arc length limiters, each of the phase-to-phase arc length limiters being electrically connected to a corresponding one of the electrical bus members, each of the phase-to-phase arc length limiters having a first edge and a second edge, the first edge establishing a first gap to an adjacent one of the phase-to-phase arc length limiters; and a phase-to-ground arc length limiter electrically connected to the housing, the phase-to-ground arc length limiter comprising a number of members structured to attach an arc, each of the number of members having a number of arc attachment portions establishing a second gap to the second edge of the phase-to-phase arc length limiters.

In accordance with another aspect of the disclosed concept, an electrical enclosure comprises: a housing comprising a first end, an opposite second end, and a plurality of sides disposed therebetween to define an internal volume; an electrical busway comprising a plurality of electrical bus members; and a plurality of phase-to-phase arc length limiters, each of the phase-to-phase arc length limiters being electrically connected to a corresponding one of the electrical bus members, each of the phase-to-phase arc length limiters having an edge establishing a gap to an adjacent one of the electrical bus members, wherein the corresponding one of the electrical bus members includes a conductor separated from a corresponding one of the phase-to-phase arc length limiters, wherein current normally flows in the corresponding one of the electrical bus members and in the conductor separated from the corresponding one of the phase-to-phase arc length limiters, but not in the corresponding one of the phase-to-phase arc length limiters, and wherein each of the phase-to-phase arc length limiters direct fault current flowing in the corresponding one of the electrical bus members in an arc between an adjacent pair of the phase-to-phase arc length limiters, but not in the conductor.

In accordance with another aspect of the disclosed concept, an electrical enclosure comprises: a housing comprising a first end, an opposite second end, and a plurality of sides disposed therebetween to define an internal volume; an electrical busway comprising a number of electrical bus members; and a phase-to-ground arc length limiter electrically connected to the housing, the phase-to-ground arc length limiter comprising a number of members, each of the number of members having a number of arc attachment portions establishing a second gap to the second edge of the number of electrical bus members.

In accordance with another aspect of the disclosed concept, a method reduces pressure caused by an arcing fault. The method comprises: employing an electrical busway comprising a plurality of electrical bus members; employing a plurality of phase-to-phase arc length limiters, each of the phase-to-phase arc length limiters being electrically connected to a corresponding one of the electrical bus members, each of the phase-to-phase arc length limiters having an edge establishing a gap to an adjacent one of the phase-to-phase arc length limiters; including with the corresponding one of the electrical bus members a conductor separated from a corresponding one of the phase-to-phase arc length limiters; providing normal current flow in the corresponding one of the electrical bus members and in the conductor separated from the corresponding one of the phase-to-phase arc length limiters; but not in the corresponding one of the phase-to-phase arc length limiters; and directing fault current flowing in each of the phase-to-phase arc length limiters and in the corresponding one of the electrical bus members in an arc between an adjacent pair of the phase-to-phase arc length limiters, but not in the conductor.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
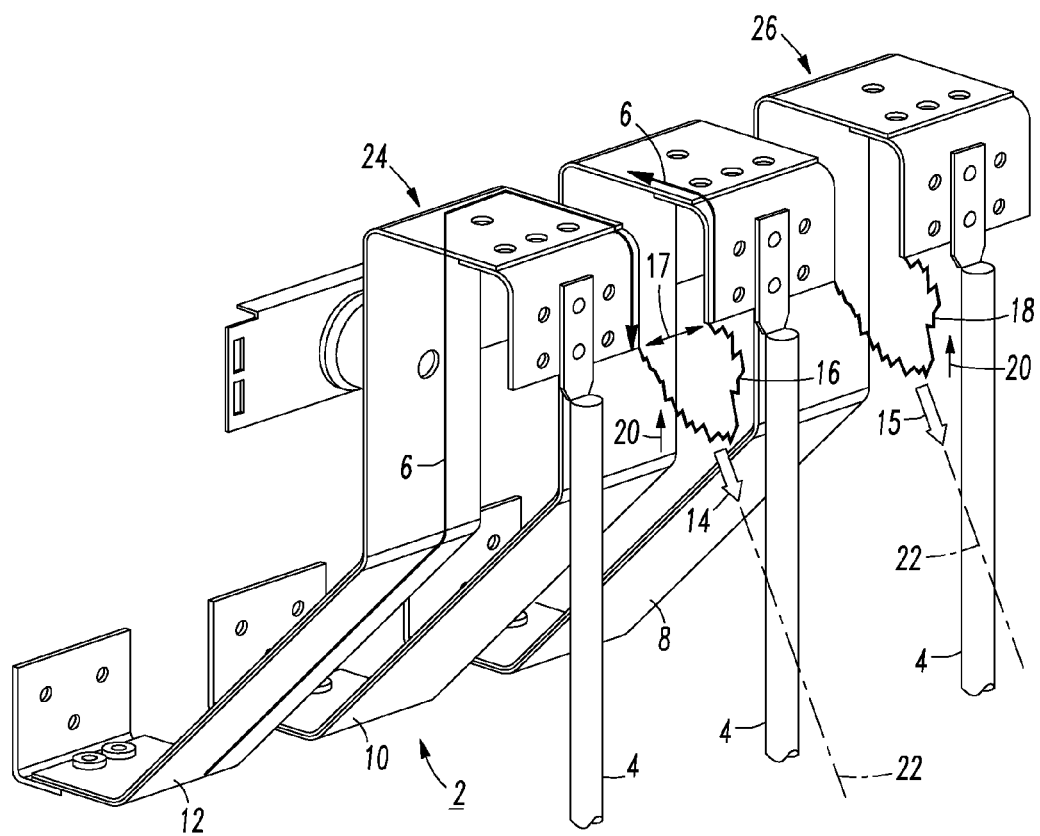
FIG. 1 is an isometric view of a three-phase electrical busway including back-connected power cables.

As employed herein, the term "number" shall mean one or an integer greater than one (i.e., a plurality).

As employed herein, the term "electrical bus" or "electrical bus member" or "bus member" means a substantially rigid or rigid conductor or a flexible conductor or another suitable power conductor which carries or transfers voltage, current and/or power.

As employed herein, the term "electrical busway" means a plurality of electrical bus members for an electrical enclosure. The electrical bus members receive electrical power from, for example, a utility or other suitable power source.

As employed herein, the statement that two or more parts are "coupled" together shall mean that the parts are joined together either directly or joined through one or more intermediate parts.

Directional phrases used herein, such as, for example, top, bottom, front, back, left, right, upper, lower and derivatives thereof, relate to the orientation of the elements shown in the drawings and are not limiting upon the claims unless expressly recited therein.

For purposes of illustration, embodiments of the disclosed concept will be described as applied to switchgear enclosures, although it will become apparent that they could also be applied to other types of electrical enclosures (e.g., without limitation, electrical distribution centers; motor control centers; meter centers; modules or compartments of larger electrical enclosures; low, medium or high voltage enclosures; panelboards; switchboards; load centers; transfer switches).

In arc resistant equipment, a relatively greater distance between phases and between phase and ground provides higher arc voltage, arc power and arc pressure. Embodiments of the disclosed concept provide arc length limiters that reduce the distance between phases and between phase and ground in an environmentally friendly manner (e.g., without limitation, without resort to use of an insulating gas, such as sulfur hexafluoride ($SF_6$)).

Figure 2:
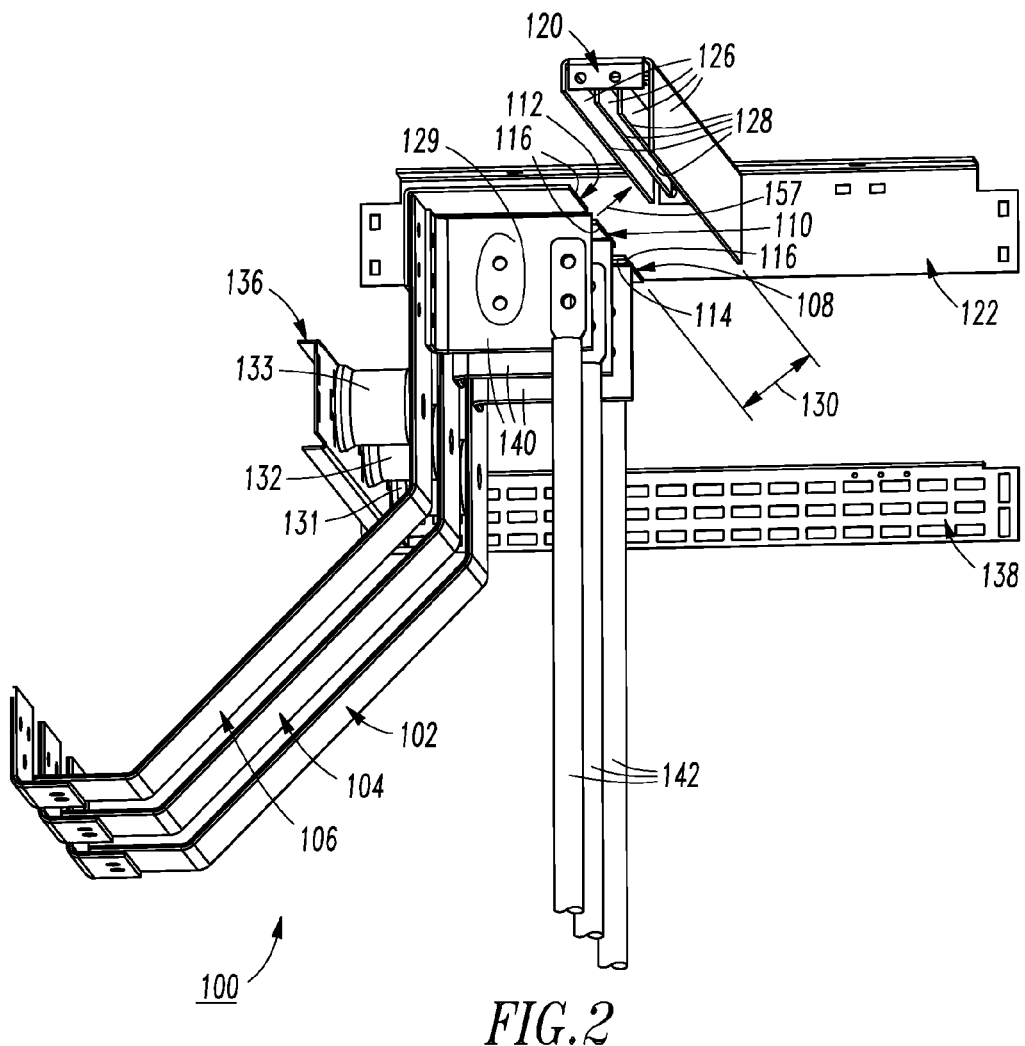
FIGS. 2 and 3 are isometric views of three-phase electrical busways including arc length limiter configurations in accordance with other embodiments of the disclosed concept.

Referring to FIG. 2, an electrical busway 100 includes a plurality of electrical bus members 102,104,106. A plurality of phase-to-phase arc length limiters 108,110,112 are electrically connected to the electrical bus members 102,104,106, respectively. As best shown with the phase-to-phase arc length limiters 108,110,112 in FIG. 4, each of the phase-to-phase arc length limiters has a first edge 114 (limiter 110 has two edges 114) and a second edge 116. The first edge 114 establishes a first gap 118 to an adjacent one of the phase-to-phase arc length limiters 108,110,112. A phase-to-ground arc length limiter 120 is electrically connected to a housing 122 of an electrical enclosure 124 (as shown in FIG. 5). The phase-to-ground arc length limiter 120 includes a number of members, such as the example plates 126. Each of the example plates 126 has a number of arc attachment portions, such as an example third edge 128 establishing a second gap 130 to the second edge 116 of the phase-to-phase arc length limiters 108,110,112. Although one or more example plates 126 are shown, any number of members structured to attach an arc to ground during a phase-to-ground arcing time can be employed. For example and without limitation, other suitable number of members can be a flat grounded metal plate, a number of longitudinally oriented plates, bolts or pins (e.g., single; array), any grounded conductive or semi-conductive surface (e.g., carbon/graphite), or any surface that allows the arc to become attached and remain attached during the arcing time.

Example 1

Figure 3:
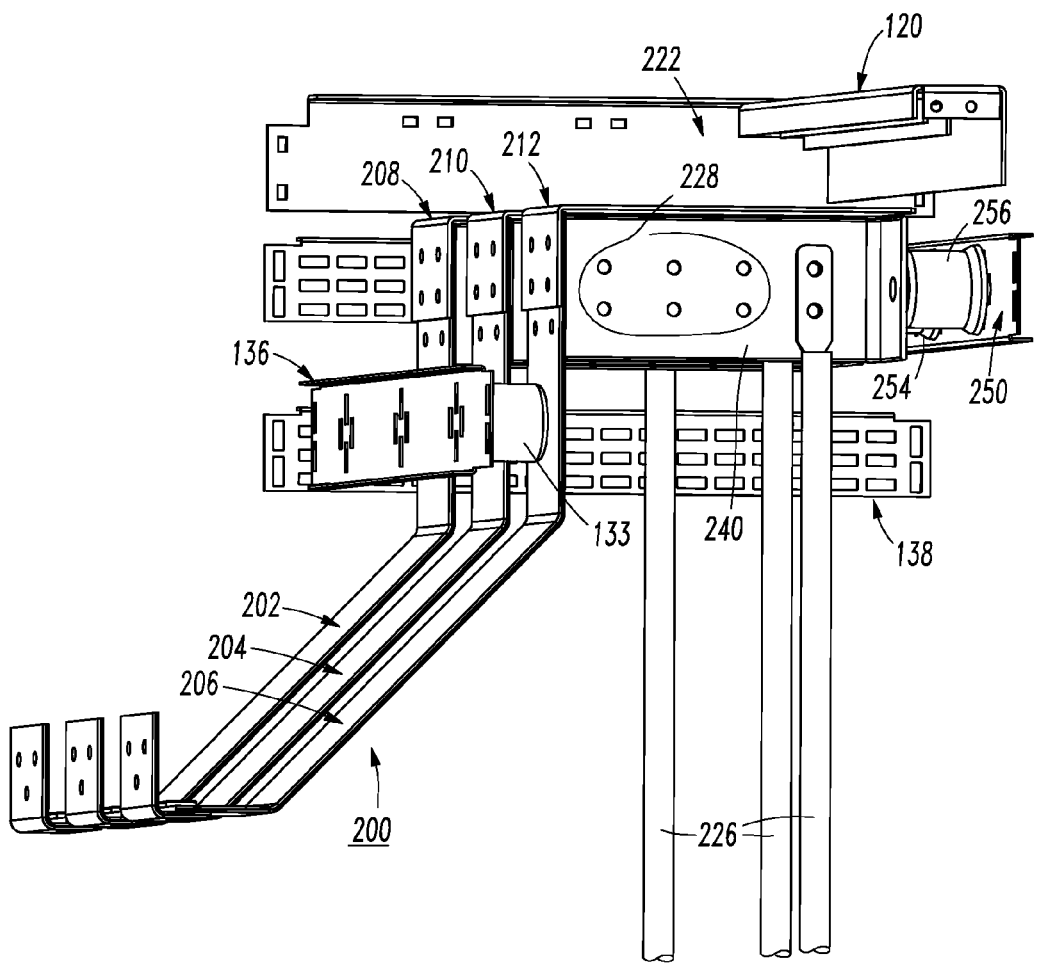
Figure 6:
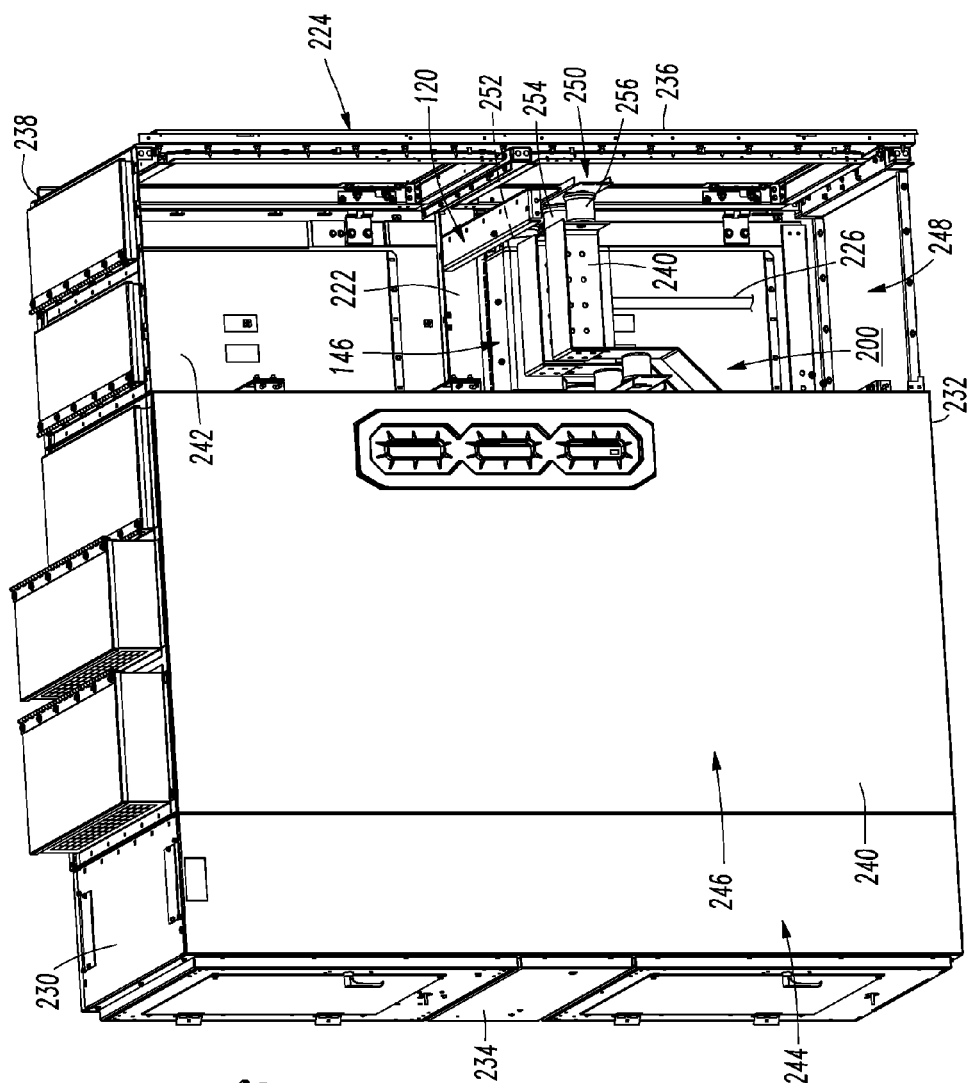
FIG. 6 is an isometric view of an electrical enclosure including the arc length limiter configuration of FIG. 3.

FIG. 3 shows another electrical busway 200 including a plurality of electrical bus members 202,204,206. A plurality of phase-to-phase arc length limiters 208,210,212 are electrically connected to the electrical bus members 202,204,206, respectively. The phase-to-ground arc length limiter 120 is electrically connected to a housing 222 of an electrical enclosure 224 (as shown in FIG. 6). The phase-to-phase arc length limiters 208,210,212 are similar to the phase-to-phase arc length limiters 108,110,112 of FIG. 2, except that they have a greater length of the cable terminal pad 240 in order to accommodate a larger number of power cables, such as 226 (e.g., four example sets of openings 228 are shown in FIG. 3 (one set being hidden), while there are two example sets of openings 129 in FIG. 2 (one set being hidden).

The electrical enclosure 224 of FIG. 6 includes a housing with a first end 230, an opposite second end 232, and a plurality of sides 234,236,238,240 disposed therebetween to define an internal volume 242. The electrical enclosure 224 is further divided into a plurality of compartments or modules, such as modules 244,246,248. It will be appreciated that a portion of the side 240 and the module 248 is not shown in order to show internal structures such as the example electrical busway 200. Each of the modules 244,246,248 can be considered to be an electrical enclosure as employed herein.

For example and without limitation, the front module 244 (to the left of FIG. 6) can include relays, switches, metering devices, pull fuses, and supplementary protectors; the mid module 246 (in about the center of FIG. 6) can include circuit breakers, voltage or control power transformers, fuse trucks, earthing switches, ground and test devices, and current transformers; and the rear module (to the right of FIG. 6) can include electrical busways and electrical devices, such as earthing switches, rear mounted control power transformers, and lightning arresters.

Example 2

Referring again to FIG. 2, the three electrical bus members 102,104,106 are made, for example, of copper, although any suitable conductor can be employed. Although three example electrical bus members 102,104,106 are shown, the disclosed concept is applicable to electrical busways having two or more electrical bus members. The electrical bus members 102,104,106 can be mechanically supported by three insulators 131,132,133, respectively, which are coupled to a bracket 136 (e.g., powder-coated) supported by a side wall 138 of the housing 122.

The electrical bus members 102,104,106 include example copper cable terminal pads 140, although any suitable conductor can be employed. Power cables 142 (e.g., without limitation, line; load) are electrically connected to the cable terminal pads 140. The phase-to-phase arc length limiters 108,110,112 can be made of zinc chromate plated steel and set the desired phase-to-phase gap 118 (FIG. 4) (e.g., without limitation, about 4 inches; any suitable gap while still maintaining desired Basic Impulse Lightning (BIL) requirements; a suitable minimum gap that will not jeopardize electrical tests per industry standards). The phase-to-ground arc length limiter 120 can be made of zinc chromate plated steel and is electrically connected (e.g., without limitation, bolted; welded; brazed; riveted; clamped; any suitable mechanism to provide a sufficient preload to maintain a good electrical path) to the housing 122 (e.g., side channel) of the electrical enclosure 124 (FIG. 5), which is suitably grounded.

The phase-to-phase arc length limiters 108,110,112 are suitably electrically connected to the respective electrical bus members 102,104,106. However, the placement of the phase-to-phase arc length limiters 108,110,112 is not limited to be at an electrical joint in the bus member, but can be located anywhere along such bus member. For example, these phase-to-phase arc length limiters could be welded or otherwise suitably electrically connected anywhere on a continuous piece of an electrical bus member. For placement of the phase-to-phase arc length limiters 108,110,112 at an electrical joint, there are many factors that determine a suitable electrical joint/connection (e.g., without limitation, finish; hardness; preload; surface area). The actual mechanism for electrical connection depends upon the desired makeup of the electrical joint.

The example phase-to-ground arc length limiter 120 includes four example plates 126, although any suitable number of members, such as one or more plates, can be employed. The edges 128 of each of the plates 126 are parallel to each other and are equidistant (e.g., without limitation, the second gap 130 is about 4 inches; any suitable gap) from the edges 116 of the phase-to-phase arc length limiters 108,110,112, which edges 116 are also parallel to each other.

The phase-to-phase arc length limiters 108,110,112 are employed on the respective bus members 102,104,106 and the phase-to-ground arc length limiter 120 is electrically connected to the housing 122 of the electrical enclosure 124 (FIG. 5). Placement of these arc length limiters 108,110,112, 120 is done by recognizing what direction the phase-to-phase arcs 144 (shown in FIGS. 4 and 5) are anticipated to travel due to, for example, bus geometry, magnetic force and gas force. By reducing or minimizing the length of the phase-to-phase arcs 144, subject to design constraints or design considerations, this provides reduced total arc power, lower peak pressure, and a "successful pass" of an arc test, such as for example and without limitation, a 15 kV rated metal clad switchgear assembly, tested at 63 kA per IEEE Std C37.20.7™-2007 (IEEE Guide for Testing Metal-Enclosed Switchgear Rated Up to 38 kV for Internal Arcing Faults).

Typically, the rear (e.g., in a direction out of the plane of FIG. 5) of the enclosure 124 (FIG. 5) is toward the right of FIG. 2.

As shown in FIG. 6, a suitably thin insulator 146 (e.g., a six-sided, insulative boot) can cover the terminal end of each of the power cables 226 (FIG. 3). The thickness of the insulator 146 is such that the phase-to-phase arcs (not shown in FIG. 3 or 6, but see the phase-to-phase arcs 144 of FIGS. 4 and 5) are not obstructed by the insulator 146 during the fault.

Example 3

As another non-limiting example, the phase-to-phase distance of the first gap 118 (FIG. 4) can be about 3.5 inches and the phase-to-ground distance of the second gap 130 (FIG. 2) could range from about 3.17 inches to about 3.78 inches. However, the actual distances can be modified depending on a particular design with one goal of keeping it as close to about 4 inches as possible, although larger or smaller distances are possible. Primarily, the BIL requirement prevents a closer spacing; otherwise, the gap 118 could have about a 1-inch separation.

For example, for 15 kV rated metal clad switchgear per IEEE C37.20.2 and IEEE C37.20.7 standards, there is an insulated bus and the bus joints are insulated with insulative boots, as one example. For 15 kV rated switchgear, the IEEE standards employ a 95 kV BIL test. The design parameters to pass this test use about 3-inch minimum phase-to-phase and phase-to-ground clearances. Slightly larger gaps as set forth in this example can be employed because sharp edges are at close proximity. The extra distance is a factor of safety to pass the 95 kV BIL test.

For example, the phase-to-phase gap 118 and the phase-to-ground gap 130 can depend upon meeting suitable design standards and/or design criteria for a particular product (e.g., without limitation, standards, such as NEC, IEEE, CSA or IEC; other suitable standards; other controlling factor(s)). Preferably, the gaps 118,130 are as small as possible, but meet the desired design standards and/or design criteria.

As another non-limiting example, the phase-to-phase gap 118 and the phase-to-ground gap 130 can vary with voltage. For example and without limitation, the gaps 118,130 can be relatively greater at relatively higher voltages (e.g., without limitation, about 7 inches to about 8 inches for 38 kV) and relatively lower for relatively lower voltages (e.g., without limitation, about 1.5 inches to about 2 inches for 5 kV; about 1 inch for 2.4 kV; less than 1 inch for 600 V).

Example 4

In the example of FIG. 3, one of the sides of the enclosure 224 (FIG. 6) supports a bracket 250 carrying a plurality of insulators 252 (shown in hidden line drawing in FIG. 6), 254 and 256. Each of these insulators supports one of the cable terminal pads 240 of the electrical bus members 202,204,206.

Example 5

Figure 4:
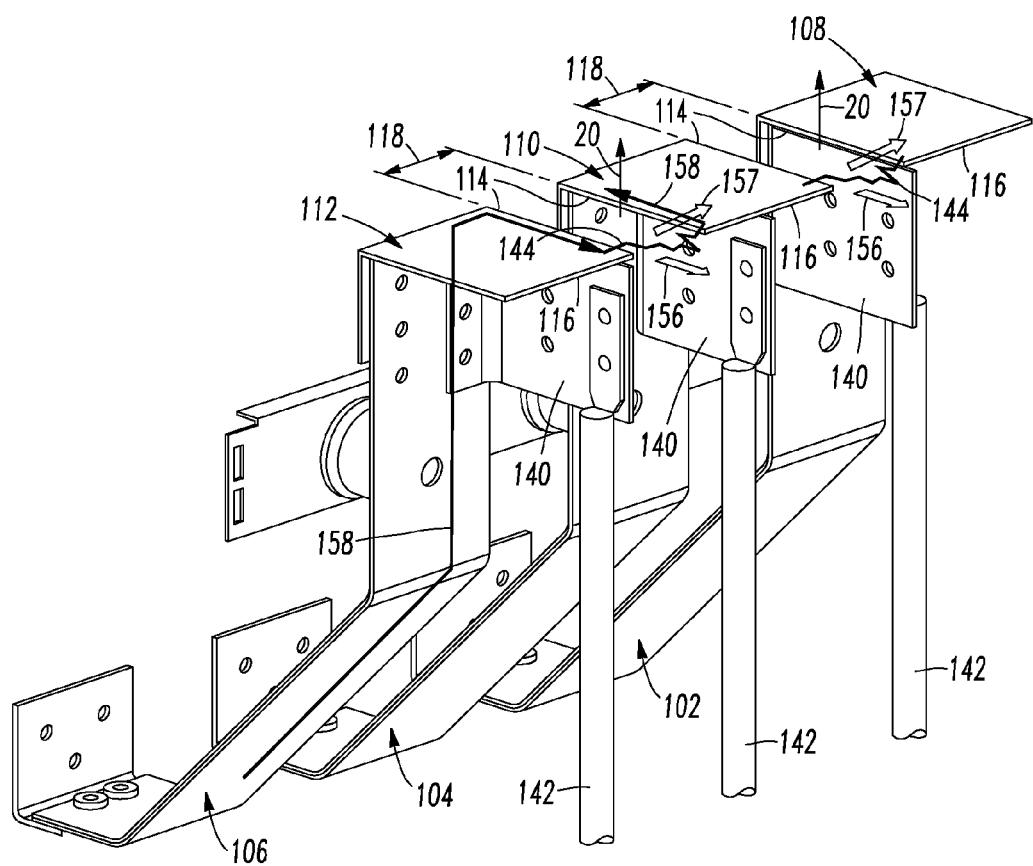
FIG. 4 is an isometric view of the three-phase electrical busway and the phase-to-phase arc length limiters of FIG. 2.
Figure 5:
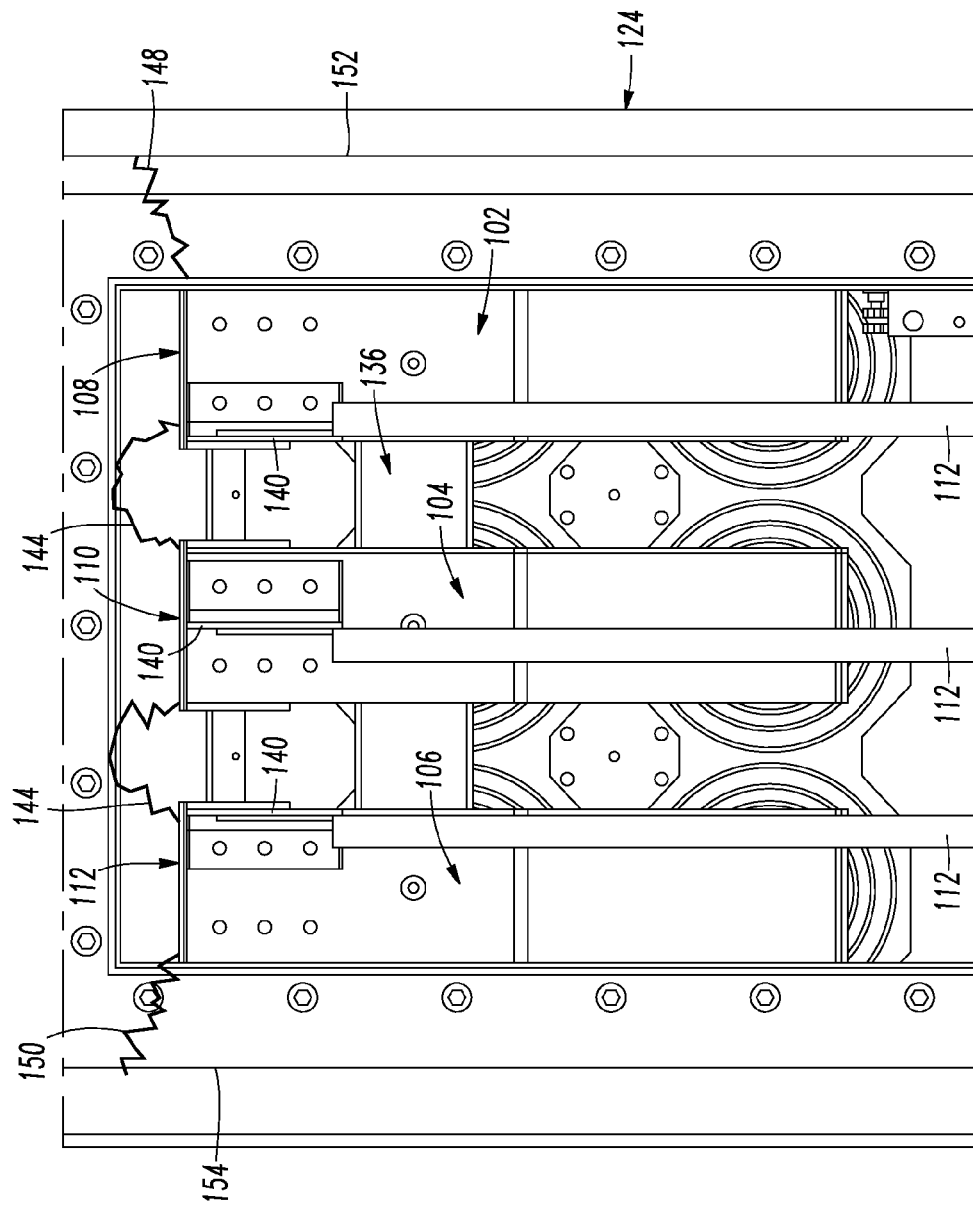
FIG. 5 is a vertical elevation view of the three-phase electrical busway and the phase-to-phase arc length limiters of FIG. 2 as mounted in an electrical enclosure.

Referring to FIGS. 2, 4 and 5, the plates 126 of the phase-to-ground arc length limiter 120 typically show arc attachment from at least the edge 116 of the center phase at the center phase-to-phase arc length limiter 110. The outer phases at the outer phase-to-phase arc length limiters 108,112 can arc at 148,150 to the adjacent side walls 152,154, respectively, of the electrical enclosure 124 and to the center phase as shown in FIG. 5. The arc fault can start, for example, as a phase-to-phase fault and then transition to a phase-to-ground fault as the fault current 158 and the convective force motivate, at 157, the arcs 144 upward and rearward (up and to the right with respect to FIG. 2) to the phase-to-ground arc length limiter 120 (FIG. 2). Hence, for a typical arcing fault, the arc length limiters 108,110,112,120 and the sidewalls 152,154 all show arc attachment.

As can be seen in FIGS. 2, 4 and 5, the electrical bus member 102 and the cable terminal pad 140 thereof form a first L-shape, the electrical bus member 104 and the cable terminal pad 140 thereof form a T-shape, and the electrical bus member 106 and the cable terminal pad 140 thereof form a second L-shape. The T-shape of the center phase is disposed between the first L-shape and the second L-shape of the outer phases. The cable terminal pads 140 of the outer electrical bus members 102,106 form one side of the first L-shape and the second L-shape, respectively, and are disposed proximate but separated from the edges 114 of the corresponding phase-to-phase arc length limiters 108,112.

The example phase-to-phase arc length limiters 108,110, 112 prevent the length of the arcs 144 from significantly increasing since the J×B force 156 directs the arcs 144 toward the phase-to-ground arc length limiter 120. The arc current density, J, is equal to the current divided by the arc diameter. The direction of J is in the direction of current flow in the arc. The magnetic field, B, direction depends on the direction of current flow but will generally be enhanced between the gaps between the tops of the phase-to-phase arc length limiters 108,110,112, to create a force that pushes the arc outward toward the rear door (e.g., out of the plane of FIG. 5). The phase-to-phase arc length limiters 108,110,112 reduce the gap between phases. The side connected cable terminal pad 140 does not produce a magnetic field to drive the arc downward unlike the configuration of FIG. 1. The phase-to-ground arc length limiter 120 limits arc length. The configuration of FIG. 2 produces relatively shorter arcs resulting in lower arc voltage and lower pressure. The J×B force 156 (and the upward (with respect to FIG. 5) convective force 20) advantageously drive the arcs 144, at 157, toward the phase-to-ground arc length limiter 120 (FIG. 2), which is advantageously disposed somewhat above (with respect to FIG. 2) and to the rear (to the right with respect to FIG. 2) of the edges 116 of the phase-to-phase arc length limiters 108,110,112.

The J×B force 156 is produced on the arcs 144 by the cross-product of the current density (J=fault current I/cross-sectional area of the arc 144) and the self-produced magnetic field (B) due to the fault current 158 flowing in the conductors including the bus member 106 and the phase-to-phase arc length limiter 112. Unlike normal current flow, a gap (as best shown in FIG. 4) generally prevents the fault current 158 from flowing in the cable terminal pad 140. The magnetic field (B) is additive during part of the time (the current direction depends on the phase angle of the currents at that instance in time) between these conductors in the adjacent phases due to the direction of the current and the orientation of the conductors on either side of the arc 144. The cross-product is the product of the magnitudes of the J and B vectors times the sine of the angle (θ) between the vector components of the current density (J) and the magnetic field (B). In this geometry, the current and magnetic fields are mostly orthogonal, thereby maximizing the cross-product (i.e., θ=90°).

The magnetic force component on the arc is also relatively stronger than the upward (with respect to FIG. 5) convective force 20. As an example, in the left phase (with respect to FIG. 5) during an instance in time when the currents are such that the current path is flowing upward (with respect to FIG. 5) in the left bus and downward (with respect to FIG. 5) in the center bus, the fault current path 158 flows up (with respect to FIG. 5) and into the phase-to-phase arc length limiter 112 and into the arc and back into the center phase-to-phase arc length limiter 110. The net movement of the arc 144 by the J×B force 156 and the upward (with respect to FIG. 5) convective force 20 is that the arc 144 is directed, at 157, toward the phase-to-ground arc length limiter plates 126 and is subsequently lengthened significantly less than the arcs 16,18 of FIG. 1, which are moved significantly downward (with respect to FIG. 1) by the downward magnetic force component (not shown) since there is no phase-to-phase arc length limiter and since the power cables 4 are electrically connected to downwardly extending cable terminal portions as shown in FIG. 1.

As shown with the electrical bus member 106 of FIG. 4, each of the phase-to-phase arc length limiters 108,110,112 and the corresponding electrical bus members 102,104,106, respectively, direct the fault current 158 flowing therein in the arc 144 between the adjacent pair of the phase-to-phase arc length limiters 112,110.

The electrical bus members 102,104,106 include conductors (e.g., the example cable terminal pads 140) separated from (as best shown by a gap in FIG. 4) the respective phase-to-phase arc length limiters 108,110,112. Current normally flows in the corresponding one of the electrical bus members 102,104,106 and in the conductor 140 separated from the corresponding one of the phase-to-phase arc length limiters 108,110,112, but not in the corresponding one of the phase-to-phase arc length limiters 108,110,112. Each of the phase-to-phase arc length limiters 108,110,112 direct the fault current 158, as shown with electrical bus member 106 and phase-to-phase arc length limiter 112, flowing in the corresponding one of the electrical bus members in the arc 144 between an adjacent pair of the phase-to-phase arc length limiters 112, 110, but not in the conductor 140.

The arcs 144 would move horizontally outward (out of the plane of FIG. 5) if it was not for the convective force 20 that tends to raise (with respect to FIG. 5) the arcs 144.

Example 6

Although the electrical enclosure 124 advantageously employs both of the plural phase-to-phase arc length limiters 108,110,112 and the phase-to-ground arc length limiter 120 (as shown in FIG. 2), the disclosed concept is applicable to configurations that employ only plural phase-to-phase arc length limiters, such as 108,110,112 (FIG. 5).

Example 7

Although the electrical enclosure 124 advantageously employs both of the plural phase-to-phase arc length limiters 108,110,112 and the phase-to-ground arc length limiter 120 (as shown in FIG. 2), the disclosed concept is applicable to configurations that employ only the phase-to-ground arc length limiter 120. This limiter 120 can be placed on the sidewalls in addition to above the arcing area and, in this example, the arcs 144 can be struck between the sides of the adjacent electrical bus members 102,104,106. However, the limiter 120 can advantageously be placed anywhere the arc is anticipated to be located.

Example 8

Table 1 compares peak power, peak pressure, time-to-ground, and test result for the disclosed concept and for prior back-connected power cables (FIG. 1) with no arc length limiters.

TABLE 1

|  | Peak Power | Peak Pressure | Time-to-Ground | Test Result |
|---|---|---|---|---|
| Phase-to-ground arc length limiter | 219 MW | 18 psig | 1.1 mS | Passed |
| Back-connected power cables with no arc length limiters | 287 MW | 28 psig | 2.1 mS | Failed |

It will be appreciated that although the disclosed concept illustrates application of the phase-to-ground arc length limiter 120 together with the phase-to-phase arc length limiters 108,110,112 or 208,210,212, each of these arc length limiters can be independently employed.

The phase-to-ground arc length limiter 120 advantageously limits the upward (with respect to FIGS. 2 and 6) path of the arcs 144 (FIGS. 4 and 5) and, thus, limits the arc length.

The phase-to-phase arc length limiters 108,110,112 or 208, 210,212 use the direction of the fault current 158 to provide a corresponding J×B force 156, which in combination with the convective force, advantageously drives the arcs 144 toward the phase-to-ground arc length limiter 120 (FIG. 2).

The time for the arcs 144 to attach to a ground return is also greatly reduced by the phase-to-ground arc length limiter 120, thereby resulting in relatively lower arc power and arc pressure. Hence, the disclosed concept provides enhanced protection for electrical enclosures, such as for example and without limitation, switchgear enclosures.

It will be appreciated that any phase-to-phase arc length limiter or any phase-to-ground arc length limiter as disclosed herein can be suitably formed and/or electrically connected to a corresponding electrical bus member or an electrical enclosure housing, respectively, by any known or suitable mechanism or method, including, but not limited to, welding.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical enclosure comprising:
a housing comprising a first end, an opposite second end, and a plurality of sides disposed therebetween to define an internal volume;
an electrical busway comprising a plurality of electrical bus members;
a plurality of phase-to-phase arc length limiters, each of the phase-to-phase arc length limiters being electrically connected to a corresponding one of said electrical bus members, each of the phase-to-phase arc length limiters having a first edge and a second edge, the first edge establishing a first gap to an adjacent one of said phase-to-phase arc length limiters; and
a phase-to-ground arc length limiter electrically connected to said housing, said phase-to-ground arc length limiter comprising a number of members structured to attach an arc, each of the number of members having a number of arc attachment portions establishing a second gap to the second edge of the phase-to-phase arc length limiters.

2. The electrical enclosure of claim 1 wherein the plurality of electrical bus members is three copper busses.

3. The electrical enclosure of claim 1 wherein each of the electrical bus members includes a cable terminal portion separated from a corresponding one of the phase-to-phase arc length limiters.

4. The electrical enclosure of claim 3 wherein one of the sides of said housing supports a bracket carrying a plurality of insulators, each of said insulators supporting the cable terminal portion of a corresponding one of said electrical bus members.

5. The electrical enclosure of claim 3 wherein the cable terminal portion is structured to receive a number of power cables.

6. The electrical enclosure of claim 1 wherein said phase-to-phase arc length limiters and said phase-to-ground arc length limiter are made of steel.

7. The electrical enclosure of claim 1 wherein said first gap is about four inches.

8. The electrical enclosure of claim 1 wherein said second gap is about four inches.

9. The electrical enclosure of claim 1 wherein one of the sides of said housing comprises a side channel; and wherein said phase-to-ground arc length limiter is electrically connected to the side channel.

10. The electrical enclosure of claim 1 wherein the number of arc attachment portions is a third edge of each of the number of members of said phase-to-ground arc length limiter is parallel to the third edge of each of the other number of members and establishes the same second gap to the second edge of each of the phase-to-phase arc length limiters.

11. The electrical enclosure of claim 10 wherein the same second gap is about four inches.

12. The electrical enclosure of claim 1 wherein the corresponding one of said electrical bus members includes a conductor separated from a corresponding one of the phase-to-phase arc length limiters; wherein current normally flows in the corresponding one of said electrical bus members and in the conductor separated from the corresponding one of the phase-to-phase arc length limiters, but not in the corresponding one of the phase-to-phase arc length limiters; and wherein each of the phase-to-phase arc length limiters direct fault current flowing in the corresponding one of said electrical bus members in an arc between an adjacent pair of the phase-to-phase arc length limiters, but not in said conductor.

13. An electrical enclosure comprising:
a housing comprising a first end, an opposite second end, and a plurality of sides disposed therebetween to define an internal volume;
an electrical busway comprising a plurality of electrical bus members; and
a plurality of phase-to-phase arc length limiters, each of the phase-to-phase arc length limiters being electrically connected to a corresponding one of said electrical bus members, each of the phase-to-phase arc length limiters having an edge establishing a gap to an adjacent one of said phase to phase arc length limiters, wherein the corresponding one of said electrical bus members includes a conductor separated from a corresponding one of the phase-to-phase arc length limiters, wherein current normally flows in the corresponding one of said electrical bus members and in the conductor separated from the corresponding one of the phase-to-phase arc length limiters, but not in the corresponding one of the phase-to-phase arc length limiters, and wherein each of the phase-to-phase arc length limiters direct fault current flowing in the corresponding one of said electrical bus members in an arc between an adjacent pair of the phase-to-phase arc length limiters, but not in said conductor.

14. The electrical enclosure of claim 13 wherein the plurality of electrical bus members are three electrical bus members; wherein the plurality of phase-to-phase arc length limiters are three phase-to-phase arc length limiters; wherein each of the three electrical bus members includes a cable terminal portion; wherein a first one of the electrical bus members and the cable terminal portion thereof form a first L-shape; wherein a second one of the electrical bus members and the cable terminal portion thereof form a T-shape; and wherein a third one of the electrical bus members and the cable terminal portion thereof form a second L-shape; wherein the T-shape is disposed between the first L-shape and the second L-shape; and wherein the cable terminal portions of the first one and the third one of the electrical bus members form one side of the first L-shape and the second L-shape, respectively, disposed proximate but separated from the edge of a corresponding one of the phase-to-phase arc length limiters.

15. The electrical enclosure of claim 14 wherein the phase-to-phase arc length limiters comprise a member having a generally rectangular shape; wherein the member has an edge defining the edge of the corresponding one of the phase-to-phase arc length limiters; wherein the member is disposed above a corresponding one of the first L-shape, the T-shape and the second L-shape; wherein the cable terminal portions of the first one and the third one of the electrical bus members are disposed proximate but separated from the edge of the member of the corresponding one of the phase-to-phase arc length limiters; and wherein the cable terminal portion of the second one of the electrical bus members bisects but is separated from the member of the corresponding one of the phase-to-phase arc length limiters.

16. An electrical enclosure comprising: a housing comprising a first end, an opposite second end, and a plurality of sides disposed therebetween to define an internal volume; an electrical busway comprising a number of electrical bus members; and a phase-to-ground arc length limiter electrically connected to said housing, said phase-to-ground arc length limiter comprising a number of members, each of the number of members having a number of arc attachment portions establishing a second gap to a second edge of a number of phase to phase arc length limiters.

17. The electrical enclosure of claim 16 wherein the number of electrical bus members is one conductive bus member.

18. The electrical enclosure of claim 16 wherein the number of electrical bus members is a plurality of conductive bus members.

19. A method of reducing pressure caused by an arcing fault, said method comprising:

employing an electrical busway comprising a plurality of electrical bus members;

employing a plurality of phase-to-phase arc length limiters, each of the phase-to-phase arc length limiters being electrically connected to a corresponding one of said electrical bus members, each of the phase-to-phase arc length limiters having an edge establishing a gap to an adjacent one of said phase-to-phase arc length limiters;

including with the corresponding one of said electrical bus members a conductor separated from a corresponding one of the phase-to-phase arc length limiters;

providing normal current flow in the corresponding one of said electrical bus members and in the conductor separated from the corresponding one of the phase-to-phase arc length limiters; but not in the corresponding one of the phase-to-phase arc length limiters; and directing fault current flowing in each of the phase-to-phase arc length limiters and in the corresponding one of said electrical bus members in an arc between an adjacent pair of the phase-to-phase arc length limiters, but not in said conductor.

20. The method of claim 19 further comprising:

employing the edge of each of the phase-to-phase arc length limiters as a first edge;

providing a second edge for each of the phase-to-phase arc length limiters;

grounding a phase-to-ground arc length limiter; and providing a number of members with the phase-to-ground arc length limiter, each of the number of members having a number of arc attachment portions establishing a gap to the second edge of the phase-to-phase arc length limiters.

* * * * *